United States Patent
Anderson et al.

(10) Patent No.: US 11,479,505 B2
(45) Date of Patent: Oct. 25, 2022

(54) CHEMICAL-RESISTANT QUARTZ-BASED CASTING COMPOSITION

(71) Applicant: Magneco/Metrel, Inc., Addison, IL (US)

(72) Inventors: Michael W. Anderson, West Chicago, IL (US); Charles W. Connors, Jr., Barrington, IL (US)

(73) Assignee: Magneco/Metrel, Inc., Deerfield, IL (US)

( * ) Notice: Subject to any disclaimer, the term of this patent is extended or adjusted under 35 U.S.C. 154(b) by 63 days.

(21) Appl. No.: 16/882,134

(22) Filed: May 22, 2020

(65) Prior Publication Data

US 2021/0363060 A1   Nov. 25, 2021
US 2022/0098103 A2   Mar. 31, 2022

(51) Int. Cl.
*C04B 14/06* (2006.01)
*C04B 28/00* (2006.01)
*C04B 111/23* (2006.01)

(52) U.S. Cl.
CPC ............ *C04B 28/008* (2013.01); *C04B 14/06* (2013.01); *C04B 14/062* (2013.01); *C04B 2111/23* (2013.01)

(58) Field of Classification Search
CPC ....... C04B 14/06; C04B 14/062; C04B 22/06; C04B 2111/23
See application file for complete search history.

(56) References Cited

U.S. PATENT DOCUMENTS

| | | | |
|---|---|---|---|
| 2,914,413 A | 11/1959 | Mercer | |
| 3,751,195 A | 8/1973 | Snow | |
| 4,056,399 A | 11/1977 | Kirkpatrick | |
| 4,814,013 A * | 3/1989 | Guzeev | C04B 14/106 106/634 |
| 4,927,309 A | 5/1990 | Sygnator | |
| 5,735,947 A | 4/1998 | Hopkins | |
| 5,950,936 A | 9/1999 | Bergart | |
| 5,989,330 A * | 11/1999 | Semler | C04B 28/24 501/153 |
| 7,771,529 B1 | 8/2010 | McPherson | |
| 7,954,549 B2 | 6/2011 | Lende et al. | |
| 8,137,454 B2 | 3/2012 | McPherson | |
| 8,480,802 B2 | 7/2013 | McPherson | |
| 8,618,006 B2 | 12/2013 | Galvan-Cazeres et al. | |
| 9,822,038 B1 | 11/2017 | Paulter et al. | |
| 10,577,280 B2 | 3/2020 | Paulter et al. | |

(Continued)

FOREIGN PATENT DOCUMENTS

| | | |
|---|---|---|
| CA | 2655930 | 1/2008 |
| CA | 2691078 | 9/2013 |

(Continued)

OTHER PUBLICATIONS

European Search Report for EP 21153838.4, dated Jul. 13, 2021.

(Continued)

*Primary Examiner* — Hoa (Holly) Le
(74) *Attorney, Agent, or Firm* — Maxwell J. Petersen; FisherBroyles, LLP

(57) ABSTRACT

A quartz-based casting composition provides excellent resistance to attack by chemicals, including weak and strong acids. The quartz-based casting composition is useful as concrete in various construction applications where corrosion resistance is needed. The casting composition includes a dry component and a wet component. The dry component includes about 25% to about 100% by weight quartz and the corrosion resistance increases with increasing quartz content.

19 Claims, 3 Drawing Sheets

(56) References Cited

U.S. PATENT DOCUMENTS

| | | | |
|---|---|---|---|
| 2002/0175453 A1 | 11/2002 | Connors, Sr. et al. | |
| 2003/0136305 A1* | 7/2003 | Shi | C04B 28/26 106/608 |
| 2007/0072957 A1 | 3/2007 | Noguchi | |
| 2008/0098903 A1 | 5/2008 | Hecker | |
| 2008/0098934 A1 | 5/2008 | Kwak | |
| 2009/0298972 A1 | 12/2009 | Galvan-Cazeres | |
| 2021/0363061 A1* | 11/2021 | Anderson | C04B 14/06 |

FOREIGN PATENT DOCUMENTS

| | | |
|---|---|---|
| CN | 103030359 | 4/2013 |
| CN | 103146301 | 6/2013 |
| GB | 1525777 | 9/1978 |
| GB | 2563904 A1 | 1/2019 |
| KR | 20070091958 | 2/2008 |
| RU | 23222419 | 6/1999 |
| WO | 9931027 A1 | 6/1999 |
| WO | 9931027 | 6/2008 |
| WO | 2012011924 | 1/2012 |

OTHER PUBLICATIONS

Wikipedia Online: "Particle Size Distribution," Apr. 17, 2020, XP055818918. URL: https://en.wikipedia.org/wiki/Particle-size_distribution.

Patil et al., "Metakaolin-Pozzolanic Material for Cement in High-strength Concrete," Journal of Mechanical engineering, ISSN 2278-1684, pp. 46-49 (2013).

\* cited by examiner

CHEMICAL-RESISTANT QUARTZ-BASED CASTING COMPOSITION

FIELD OF THE INVENTION

This invention is directed to a chemical-resistant quartz-based casting composition that can be used as concrete for construction in corrosive environments.

BACKGROUND OF THE INVENTION

In recent years, efforts to develop chemically inert and chemically resistant concrete compositions have moved toward center stage in the construction industry. These compositions are useful in a wide variety of construction applications, especially industrial construction where direct or occasional exposure to acids and other corrosive chemicals is encountered. Examples of corrosive environments include wastewater treatment plants, manholes, chemical plants, oil refineries, pulp and paper plants, sulfur pits, sumps, industrial and garage floors, roofs, drains, gutters, pipes, sewers and trenches.

U.S. Pat. No. 9,822,038, issued to Paulter et al., discloses a chemically inter concrete composition that includes, by dry weight, about 50% to about 95% by weight glass particles and about 3% to about 40% by weight colloidal silica particles, and is substantially or totally free of conventional cement. Conventional cement, such as Portland cement, is not only vulnerable in corrosive environments, but also contains caustic elements such as Group I and Group II metal oxides that can cause irritation and burns to a user's skin. The glass-based and colloidal silica-based composition disclosed in the foregoing patent to Paulter et al. eliminates these corrosive elements and is chemically inert to most acids (except hydrofluoric acid) and most other chemicals. U.S. Pat. No. 10,577,280, also issued to Paulter et al, is directed to a corresponding method of providing chemically inert concrete.

Calcium aluminate-based cements have been developed which provide somewhat improved chemical resistance over Portland cement. However, the chemical resistance of the calcium aluminate-based cements is generally limited to a pH of about 3.5-4.0 or higher. These cements generally do not perform well in stronger acidic environments that result in exposure to lower pH's.

U.S. Pat. No. 8,137,434, issued to McPherson, discloses a cement composition that includes at least 60% by weight fine or coarse glass aggregate. That composition also includes required amounts of Portland cement which is not chemically inert. Only a small amount of corrosion and degradation will adversely affect the performance of a concrete construction material.

There is a need or desire for a castable concrete composition that resists attack by both strong and weak acids over long periods of time, and which is suitable for construction and long-term use in high-stress corrosive environments.

SUMMARY OF THE INVENTION

The present invention is directed to a quartz-based casting composition that includes a dry component and a wet component. The dry component includes from about 25% to about 100% by weight quartz and the wet component includes an aqueous colloidal silica binder. The invention includes a high-performance embodiment and a lower cost embodiment. The high-performance embodiment includes a higher amount of quartz in the dry component than the lower cost embodiment. The casting composition of the invention is useful as a concrete for various construction applications in which resistance to strong and weak acids and other chemical exposure is needed. These applications include without limitation wastewater treatment plants, manholes, chemical plants, oil refineries, pulp and paper plants, sulfur pits, sumps, industrial and garage floors, roofs, drains, gutters, pipes, sewers and trenches.

In one embodiment, the invention is directed to a quartz-based casting composition that includes a dry component and a wet component;

the dry component including about 25% to about 100% by weight quartz, zero to about 25% by weight gravel and zero to about 50% by weight concrete sand;

the wet component including about 30% to about 60% by weight colloidal silica particles and about 40% to about 70% by weight water;

wherein the quartz-based casting composition includes about 65% to about 97% by weight of the dry component and about 3% to about 35% by weight of the wet component.

In another embodiment, the invention is directed to a quartz-based casting composition including a dry component and a wet component;

the dry component including at least about 85% by weight quartz and optionally at least about 1% by weight microsilica also known as "silica fume");

the wet component including about 30% to about 60% by weight colloidal silica particles and about 40% to about 70% by weight water;

wherein the quartz-based casting composition includes about 65% to about 97% by weight of the dry component and about 3% to about 35% by weight of the wet component.

In another embodiment, the invention is directed to a quartz-based casting composition including a dry component and a wet component;

the dry component including about 25% to about 40% by weight quartz, about 10% to about 30% by weight gravel, and about 35% to about 50% by weight concrete sand;

the wet component including about 30% to about 60% by weight colloidal silica particles and about 40% to about 70% by weight water;

wherein the quartz-based casting composition includes about 65% to about 97% by weight of the dry component and about 3% to about 35% by weight of the wet component.

With the foregoing in mind, it is a feature and advantage of the invention to provide a chemical-resistant quartz-based casting composition that provides resistance to strong acids, weak acids and other chemicals in corrosive environments.

It is also a feature and advantage of the invention to provide a chemical-resistant, quartz-based casting composition that is useful in the construction of wastewater treatment plants, manholes, chemical plants, oil refineries, pulp and paper plants, sulfur pits, sumps, industrial and garage floors, roofs, drains, gutters, pipes, sewers and trenches.

It is also a feature and advantage of the invention to provide a method of making a chemical-resistant quartz-based concrete structure.

These and other features and advantages of the invention will become further apparent from the following detailed description of the invention, read in conjunction with the drawings.

DETAILED DESCRIPTION OF THE INVENTION

Figure 1:
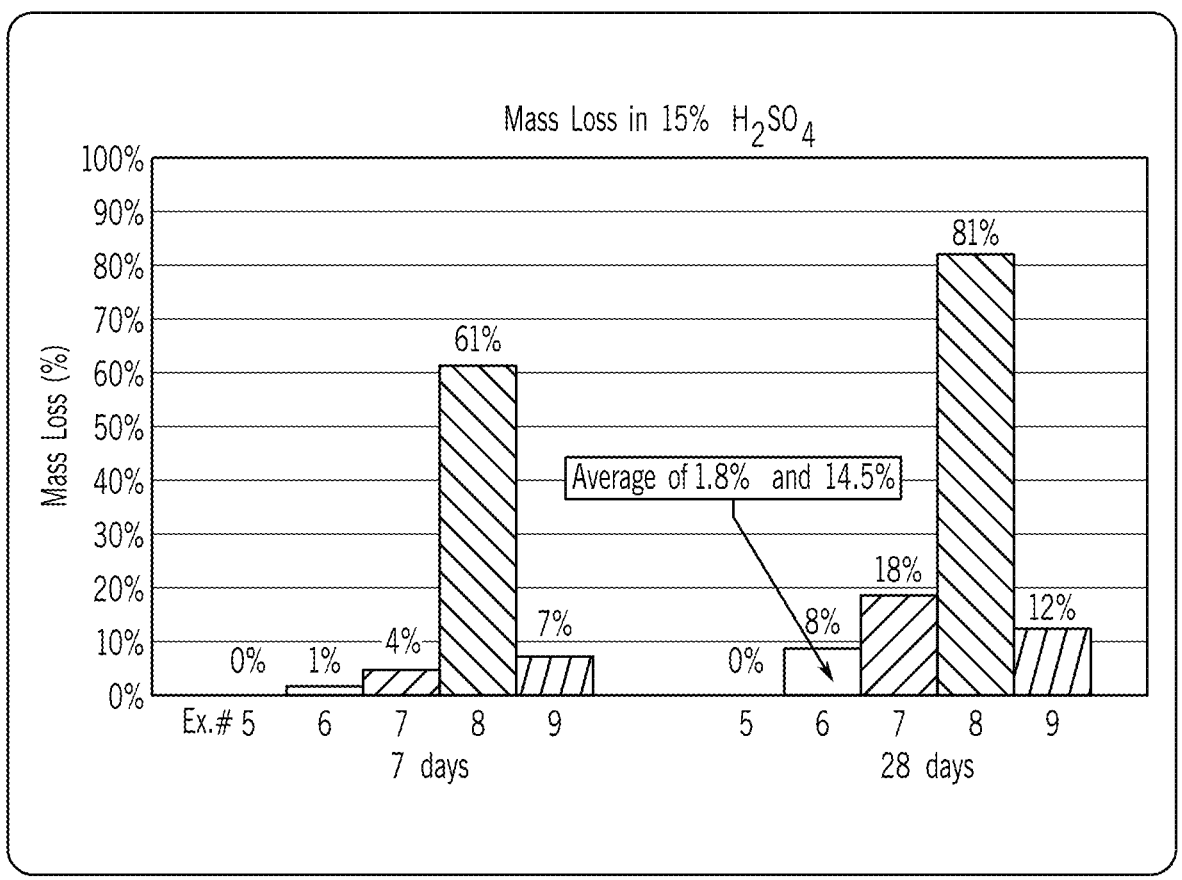
FIG. 1 is a bar graph showing mass loss of concrete blocks made from the inventive high-performance chemical-resistant quartz-based casting composition, the inventive lower cost quartz-based casting composition, and three commercially available concrete compositions after seven days and 28 days in a 15% sulfuric acid solution.

The invention is directed to a quartz-based casting composition having excellent chemical resistance in a corrosive environment and a method of making a chemical-resistant quartz-based concrete. The quartz-based casting composition includes a dry component and a wet component. The dry component includes about 25% to about 100% by weight quartz, zero to about 50% by weight gravel, and zero to about 50% by weight concrete sand. The wet component includes about 30% to about 60% by weight colloidal silica particles and about 40% to about 70% by weight water. The quartz-based casting composition can include about 65% to about 97% by weight of the dry component, suitably about 75% to about 95% by weight of the dry component, or about 85% to about 93% by weight of the dry component. The quartz-based casting composition can include about 3% to about 35% by weight of the wet component, suitably about 5% to about 25% by weight of the wet component, or about 7% to about 15% by weight of the wet component.

The quartz-based casting composition includes a high-performance, higher cost embodiment in which the dry component includes higher percentages of quartz, and a suitable lower cost embodiment in which the dry component includes lower percentages of quartz mixed with sand and gravel. In the high-performance embodiment, the dry component can include at least about 50% by weight quartz, suitably at least about 75% by weight quartz, or at least about 85% by weight quartz, or at least about 90% by weight quartz, or at least about 95% by weight quartz, and can include up to about 100% by weight quartz, or up to about 99% by weight quartz, or up to about 98% by weight quartz, or up to about 97% by weight quartz, or up to about 96% by weight quartz, or up to about 95% by weight quartz. For example, the dry component can include about 50% to about 99% by weight quartz, or about 75% to about 98% by weight quartz, or about 85% to about 97% by weight quartz, or about 90% to about 97% by weight quartz. The dry component of the high-performance embodiment can optionally include at least about 1% by weight microsilica, or at least about 2% by weight microsilica, or at least about 3% by weight microsilica, and can include up to about 25% by weight microsilica, or up to about 15% by weight microsilica, or up to about 10% by weight microsilica, or up to about 5% by weight microsilica. Microsilica is also known as "silica fume" whose individual particles have a spherical shape and a mean size of 0.1 to 0.3 microns. In one embodiment, the quartz and the optional microsilica (if present) constitute about 90-100% by weight, or about 95-99% by weight of the dry component. The optional microsilica aids the flow of the quartz-based casting composition and reduces the porosity (and thus, the exposed surface area) of a concrete structure made from the quartz-based casting composition.

The particle size distribution of the quartz can also be tailored to yield a solid, compact high-performance concrete structures with minimal porosity. In one embodiment, the overall quartz can have a particle size distribution in which about 10-35% by weight of the quartz, suitably about 15-25% by weight of the quartz, has a particle size ranging from 0.5 inch to 6 mesh (12,700 to 3360 microns); about 20-45% by weight, suitably about 25-35% by weight of the quartz has a particle size ranging from under 6 mesh to 20 mesh (less than 3360 to 841 microns); about 5-25% by weight of the quartz, suitably about 10-20% by weight of the quartz has a particle size ranging from under 20 mesh to 50 mesh (less than 841 to 297 microns); about 5-25% by weight, suitably about 10-20% by weight of the quartz has a particle size ranging from under 50 mesh to 100 mesh (less than 297 to 149 microns); and about 15-35% by weight, suitably about 10-20% by weight of the quartz has a particle size of under 100 mesh (less than 149 microns).

The foregoing size distribution can be achieved by blending together commercially available quartz grades having known size distributions. In one embodiment, the above particle size distribution can be achieved by blending about 5-20% by weight of a quartz having a particle size of about 0.5 inch to 8 mesh (12,700 to 2380 microns), about 15-35% by weight of a quartz having a particle size of about 4 to 16 mesh (4760 to 1190 microns), about 5-20% by weight of a quartz having a particle size of about 12 to 25 mesh (1680 to 707 microns), about 2-15% by weight of a quartz having a particle size of about 20 to 50 mesh (841 to 297 microns) and about 20-50% by weight of a quartz has particle size of about 140 mesh to greater than 325 mesh (105 to less than 44 microns). Commercially available grades of quartz that meet these descriptions are available from Agsco Corporation of Wheeling, Ill. Suitable Agsco quartz grades include Quartz #10 (0.5 in. to 8 mesh), Quartz ¼×⅛ (4 to 16 mesh), Quartz #5 (5 to 14 mesh), Quartz #4 (12 to 25 mesh), Quartz #3 (20 to 50 mesh), Quartz #3/0 (140 to smaller than 325 mesh) and Quartz #4/0 (170 to smaller than 325 mesh).

The dry component of the high performance, quartz-based casting composition can also include about 0.01 to about 1% by weight of a setting agent, suitably about 0.1 to about 0.3% by weight of a setting agent. One exemplary setting agent is magnesium oxide. The dry component can also include about 0.01 to about 0.5% by weight of one or more dispersants, suitably about 0.01 to about 0.05% by weight of one or more dispersants. Exemplary dispersants include without limitation phosphonate dispersants available from Italmatch Chemicals and polyacid dispersants available from Dow Chemical Co.

The dry component of the lower cost quartz-based casting composition includes less quartz, and the quartz is mixed with concrete sand and/or gravel. Concrete sand is an aggregate sand that is usually composed of gneiss, trap rock, limestone and/or granite. This type of sand is normally crushed in a quarry and then washed and screened for quality. This process ensures that there are no large rocks in the material. One suitable gravel is Gravel #8, available from Kurtz Bros., Inc., and various other suppliers. Gravel #8, also called Pea Gravel, is a mixture of small particles of river rock which can range in size from ⅛ inch to ⅜ inch. Gravel #8 is light in color, a blend of different colors, and is typically washed and screened to remove large rocks.

The dry component of the lower-cost embodiment can include from about 25% to about 50% by weight quartz, about 10% to about 35% by weight gravel and about 30% to about 55% by weight concrete sand. Suitably, the dry component may contain about 25% to about 40% by weight quartz, or about 25% to about 35% by weight quartz; about 10% to about 30% by weight gravel, or about 15% to about 25% by weight gravel; and about 35% to about 50% by weight concrete sand, or about 40% to about 50% by weight concrete sand. Quartz is the primary element for providing the casting composition and ultimate concrete structure with chemical resistance and is also the primary driver of cost. Therefore, the lower the quartz content, the lower the cost and chemical resistance. The higher the quartz content, the higher the cost and chemical resistance. The lower-cost embodiment can also have a quartz content whose size distribution is tailored as described with respect to the high-performance embodiment described above, or a size distribution that is not tailored. In one embodiment, the size distribution of the quartz is not tailored and only one grade of quartz is used. One suitable quartz for the lower cost embodiment is Agsco Quartz #4/0, descried above, which has a size distribution ranging from about 170 to greater than 325 mesh (88 to less than 44 microns).

The elements of the dry component can be mixed together using a drum tumbler, hopper blender or other suitable dry mixer. The dry component can be combined with the wet component either a) simultaneously with the mixing of the dry component ingredients, or preferably b) separately, as described below, after both the dry component and the wet component have been separately prepared. The ingredients of the wet component are the same for both the high-performance quartz-based casting composition and the lower cost quartz-based casting composition. The wet component includes an aqueous colloidal silica suspension. The colloidal suspension can include about 40% to about 70% by weight water and about 30% to about 60% by weight colloidal silica particles, suitably about 50% to about 60% by weight water and about 40% to about 50% by weight colloidal silica particles. The colloidal silica particles have a particle size range that facilitates the formation of a colloidal suspension, and typically have a size ranging between about 1 and about 100 nanometers.

The separately prepared dry component and wet component can be combined together in a concrete mixer or other suitable mixer to form a damp slurry which can then be cast into a final concrete structure and dried, with or without heat, to form a solid chemical-resistant concrete object or layer. The castable quartz-based composition can be cast into a mold to form a concrete shape (object or block) or can be cast onto a flat or curved substrate surface to form a shaped concrete layer. The concrete shape can then be dried at ambient or elevated temperature (e.g., 230° F.) to form a concrete structure. The concrete structure (block, part or layer) can be in an environment where chemical attack might otherwise present a problem over time. Examples include without limitation concrete structures for chemical plants, oil refineries, pulp and paper plants, wastewater treatment plants, sulfur pits, manholes, sumps, floors, roofs, drains, gutters, pipes, sewers, trenches, industrial and garage floors, and other corrosive environments.

Examples 1-4

Four samples of inventive quartz-based castable compositions were prepared as damp slurries having the following ingredients (see Table 1 below). The first two samples were high-performance quartz-based casting compositions, while the third and fourth were lower-cost quartz-based casting compositions, as described in Table 1 below. The four castable compositions were formed into rectangular concrete blocks and dried to a temperature of 230° F. For the cold crushing strength test described below (ASTM C133), the blocks had dimensions of 2-inch×2-inch×2-inch. Rectangular blocks having dimensions of 8-inch×1.5-inch×1.5-inch were used for the other tests. The rectangular concrete blocks were then tested according to the procedures described below to yield the properties indicated in Table 1 below.

TABLE 1

|  | Example 1 | Example 2 | Example 3 | Example 4 |
|---|---|---|---|---|
| Ingredient |  |  |  |  |
| Gravel #8 |  |  | 20% | 20% |
| Concrete Sand |  |  | 47% | 47% |
| Quartz #10 | 12.1% | 12.7% |  |  |
| Quartz ¼ × ⅛ | 15.2% | 15.9% |  |  |
| Quartz #5 | 12.1% | 12.7% |  |  |
| Quartz #4 | 12.1% | 12.7% |  |  |
| Quartz #3 | 9.1% | 12.7% |  |  |
| Quartz #3/0 | 7.6% |  |  |  |
| Quartz #4/0 | 28.0% | 29.5% | 29.5% | 29.5% |
| Microsilica | 3.8% | 3.8% | 3.8% | 3.8% |
| MgO | 0.15% | 0.15% | 0.15% | 0.15% |
| Phosphonate Dispersant | 0.02% | 0.02% | 0.02% | 0.02% |
| Polyacid Dispersant | 0.005% | 0.005% | 0.005% | 0.005% |
| Total Dry Comp. | 100% | 100%. | 100%. | 100%. |
| Dry Component in Composition | 100 parts by wt. | 100 parts by wt. | 100 parts by wt. | 100 parts by wt. |
| Colloidal Silica (40% in Water) | 100% | 100% | 100% | 100% |
| Wet Component in Composition | 9 parts by wt. | 9 parts by wt. | 11 parts by wt. | 15 parts by wt. |
| Properties |  |  |  |  |
| Flow - ASTM C-1445 | 15 | 14 | 2 | 58 |
| Cold Crushing Strength- ASTM C133, 230° F. | 4547 psi | 4989 psi | 5200 psi | 4060 psi |
| Cold Crushing Strength- ASTM C133, 800° F. | 5023 psi | 4677 psi | 6020 psi | 5090 psi |

TABLE 1-continued

|  | Example 1 | Example 2 | Example 3 | Example 4 |
|---|---|---|---|---|
| Density - ASTM C20, 230° F. | 141 pcf | 142 pcf | 137 pcf | 136 pcf |
| Density - ASTM C20, 800° F. | 140 pcf | 142 pcf | 137 pcf | 133 pcf |
| Porosity- ASTM C20, 230° F. | 13.2% | 12.4% | 17.4% | 18.3% |
| Porosity- ASTM C20, 800° F. | 13.0% | 12.4% | 18.0% | 20.2% |
| Quartz Size Distribution, % |  |  |  |  |
| 12,700 to 3360 microns | 20.99 | 21.99 |  |  |
| less than 3360 to 841 microns | 30.39 | 31.96 |  |  |
| less than 841 to 297 microns | 12.33 | 15.94 |  |  |
| less than 297 to 149 microns | 12.08 | 7.88 |  |  |
| less than 149 microns | 24.23 | 22.23 | 100 | 100 |

As shown above, the concrete samples made from high-performance quartz-based casting compositions of Examples 1 and 2 had less porosity and higher density compared to the lower cost quartz-based casting compositions of Examples 3 and 4. Low porosity aids chemical resistance by reducing the surface area available for exposure to chemicals. All the concrete samples had high cold crushing strength.

The concrete blocks from Examples 1-4 were tested for exposure to concentrated (78%) boiling aqueous sulfuric acid for a period of 48 hours using the procedure set forth in ASTM C-279. The concrete blocks from Examples 1 and 2 showed an average weight loss of 0.4%, which is excellent compared to competitive concrete compositions. The concrete blocks from Examples 3 and 4 showed an average weight loss of 8.54%, which is good compared to competitive concrete compositions.

Examples 5-9

For Example 5, the two 2-inch×2-inch×2-inch concrete blocks as described in Examples 1 and 2 were used and the results below were averaged. The molded composition was dried at a temperature of 230° F. to form the concrete blocks.

For Example 6, two 2-inch×2-inch×2-inch concrete blocks as described in Examples 3 and 4 were used and the results below were averaged. The molded composition was dried at a temperature of 230° F. to form the concrete blocks.

For Example 7, two concrete blocks having the same dimensions as in Examples 5 and 6 were formed using a first competitive concrete composition which is based primarily on calcium aluminate cement, and is designed for coating municipal wastewater structures including manholes, lift stations, wet wells, and the like. The composition was dried at ambient temperature to form the concrete blocks.

For Example 8, two concrete blocks having the same dimensions as in Example 5 and 6 were formed using a second competitive concrete composition which is based primarily on a modified calcium aluminate cement designed for installation by the gunite method, and is used for lining industrial chimneys, stacks and ductwork, incinerator quench chambers, molten sulfur pit linings and sulfur recovery units. The composition was dried at 230° F. to form the concrete blocks.

For Example 9, two concrete blocks having the same dimensions as in Example 5 and 6 were formed using a third competitive concrete composition which is a high-strength concrete mix used for driveways, sign footings, patios, deck supports, curbs and floors. The composition was dried at ambient temperature to form the concrete blocks.

The concrete blocks of Examples 5-9 were immersed in 15% aqueous sulfuric acid. The samples were weighed before testing and after 7 days and 28 days to determine weight loss resulting from the acid exposure. FIG. 1 is a bar graph that shows the results of the testing. The high-performance quartz-based concrete blocks of Example 5 outperformed the competitive concrete blocks of Examples 7-9 by a wide margin, yielding zero or negligible weight loss at 7 days and 28 days. The lower cost quartz-based concrete blocks of Example 6 yielded the second-best performance with average weight losses of 1% after 7 days and 8% after 28 days. The calcium aluminate cement-based concrete of Example 7 showed 4% weight loss after 7 days and much higher 18% weight loss after 28 days in the sulfuric acid. The high-strength concrete composition of Example 9 showed a modest 7% weight loss after 7 days and 12% weight loss after 28 days. The modified calcium aluminate cement composition of Example 8 mostly dissolved in the sulfuric acid, showing a 61% weight loss after 7 days and an 81% weight loss after 28 days.

Figure 2:
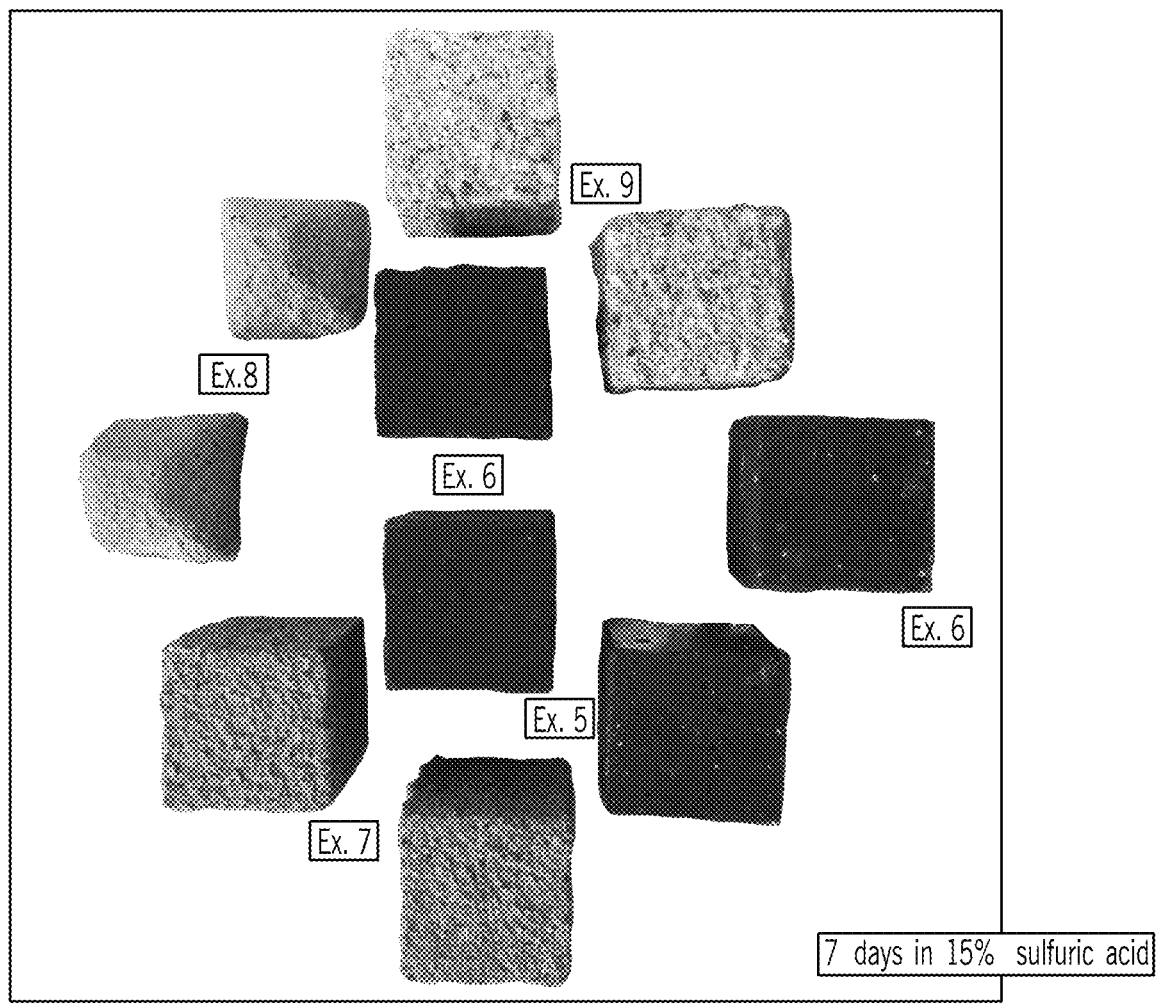
FIG. 2 shows photographs of concrete blocks formed from the inventive high-performance chemical-resistant quartz-based casting composition, the inventive lower cost quartz-based casting composition, and three commercially available concrete compositions after seven days in a 15% sulfuric acid solution.
Figure 3:
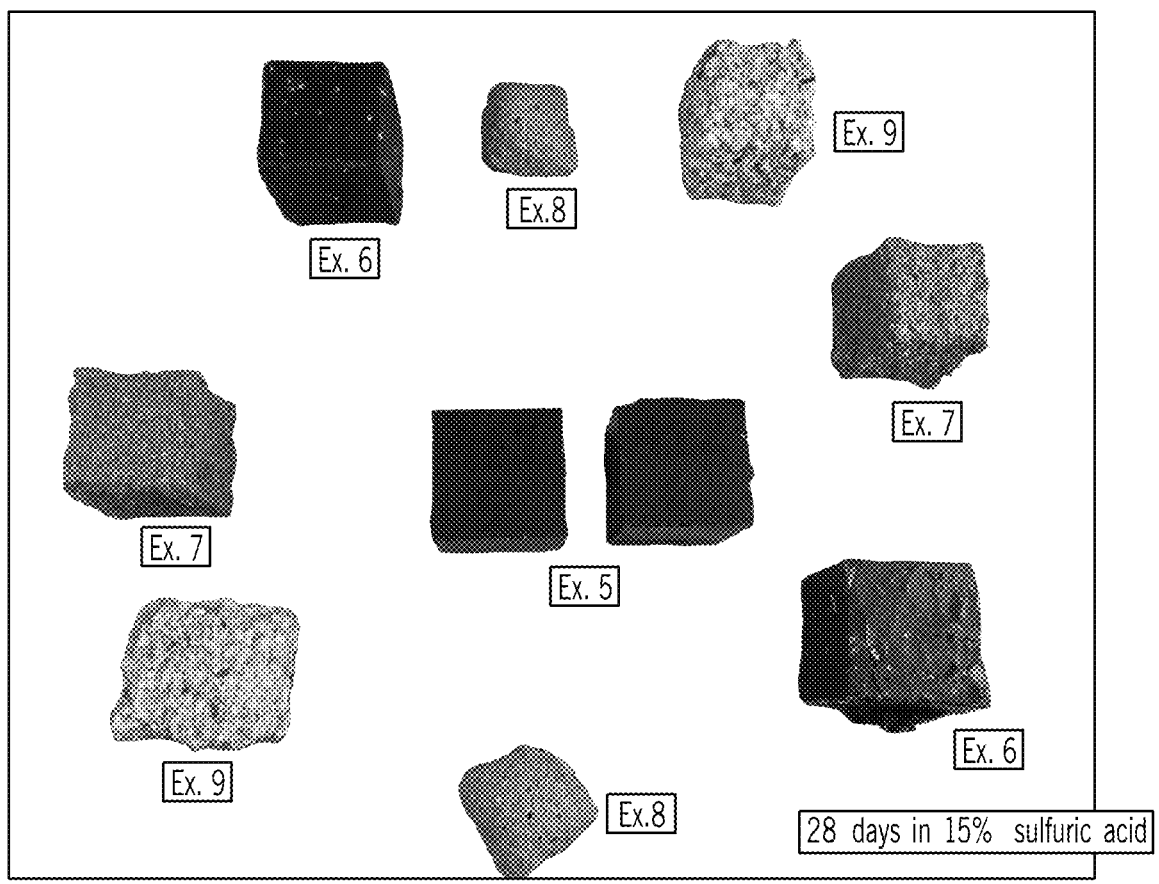
FIG. 3 shows photographs of concrete blocks formed from the inventive high-performance chemical-resistant quartz-based casting composition and from four commercially available concrete compositions after 28 days in a 15% sulfuric acid solution.

FIGS. 2 and 3 include photographs of the concrete blocks of Examples 5-9, taken after 7 and 28 days in the sulfuric acid. The concrete blocks made from the high-performance quartz-based compositions (Example 5) showed no damage after 7 and 28 days. The concrete blocks made from the lower cost quartz-based compositions (Example 6) showed negligible damage after 7 days and more noticeable damage after 28 days. The remaining concrete blocks of Examples 7-9 showed substantial damage from dissolution and weight loss after 7 days, and even more damage after 28 days.

The embodiments of the invention described herein are exemplary. Various modifications and improvements can be made without changing the spirit and scope of the invention. The scope of the invention is indicated by the appended claims, and all changes that fall within the meaning and scope of equivalents are intended to be embraced therein.

We claim:

1. A chemical-resistant quartz-based casting composition, consisting essentially of a dry component and a wet component;
   the dry component consisting essentially of about 25% to about 100% by weight quartz, about 1 to about 10% by weight microsilica having a mean individual particle size of 0.1 to 0.3 microns, zero to about 25% by weight gravel and zero to about 50% by weight concrete sand;

the wet component including about 30% to about 60% by weight colloidal silica particles and about 40% to about 70% by weight water;

wherein the quartz-based casting composition includes about 65% to about 97% by weight of the dry component and about 3% to about 35% by weight of the wet component.

2. The quartz-based casting composition of claim 1, comprising about 75% to about 95% by weight of the dry component and about 5% to about 25% by weight of the wet component.

3. The quartz-based casting composition of claim 1, wherein the dry component comprises about 2% to about 5% by weight of the microsilica.

4. The quartz-based casting composition of claim 1, wherein the colloidal silica has a median particle diameter of about 1-100 nanometers.

5. The quartz-based casting composition of claim 1, wherein the dry component includes about 50% to about 99% by weight quartz.

6. The quartz-based casting composition of claim 5, wherein the quartz has a size distribution such that about 10-35% by weight of the quartz has a particle size ranging from 0.5 inch to 6 mesh (12,700 to 3360 microns), about 20-45% by weight of the quartz has a particle size ranging from under 6 mesh to 20 mesh (less than 3360 to 841 microns), about 5-25% by weight of the quartz has a particle size ranging from under 20 mesh to 50 mesh (less than 841 to 297 microns), about 5-25% by weight of the quartz has a particle size ranging from under 50 mesh to 100 mesh (less than 297 to 149 microns), and about 15-35% by weight of the quartz has a particle size of under 100 mesh (less than 149 microns).

7. The quartz-based casting composition of claim 1, wherein the dry component includes about 75% to about 98% by weight quartz.

8. The quartz-based casting composition of claim 1, wherein the dry component includes about 90% to about 97% by weight quartz.

9. The quartz-based casting composition of claim 1, wherein the dry component includes about 25% to about 50% by weight quartz, about 10% to about 35% by weight gravel, and about 30% to about 55% by weight concrete sand.

10. The quartz-based casting composition of claim 9, wherein the quartz has a particle size of about 88 to less than 44 microns.

11. The quartz-based casting composition of claim 1, wherein, when formed into 2-inch×2-inch×2-inch concrete blocks, the composition exhibits a weight loss of less than 1% after exposure to 15% aqueous sulfuric acid for 7 days.

12. The quartz-based casting composition of claim 1, wherein, when formed into 2-inch×2-inch×2-inch concrete blocks, the composition exhibits a weight loss of less than 1% after exposure to 15% aqueous sulfuric acid for 28 days.

13. A chemical-resistant quartz-based casting composition, consisting essentially of a dry component and a wet component;

the dry component consisting essentially of at least about 85% by weight quartz and at least about 1% by weight microsilica having a mean individual particle size of 0.1 to 0.3 microns;

the wet component including about 30% to about 60% by weight colloidal silica particles and about 40% to about 70% by weight water;

wherein the quartz-based casting composition includes about 65% to about 97% by weight of the dry component and about 3% to about 35% by weight of the wet component.

14. The quartz-based casting composition of claim 13, wherein the dry component includes at least about 90% by weight quartz and at least about 2% by weight microsilica.

15. The quartz-based casting composition of claim 13, wherein the dry component includes at least about 95% by weight quartz and at least about 3% by weight microsilica.

16. The quartz-based casting composition of claim 13, wherein the quartz has a size distribution such that about 10-35% by weight of the quartz has a particle size ranging from 0.5 inch to 6 mesh (12,700 to 3360 microns), about 20-45% by weight of the quartz has a particle size ranging from under 6 mesh to 20 mesh (less than 3360 to 841 microns), about 5-25% by weight of the quartz has a particle size ranging from under 20 mesh to 50 mesh (less than 841 to 297 microns), about 5-25% by weight of the quartz has a particle size ranging from under 50 mesh to 100 mesh (less than 297 to 149 microns), and about 15-35% by weight of the quartz has a particle size of under 100 mesh (less than 149 microns).

17. The quartz-based casting composition of claim 13, comprising about 75% to about 95% by weight of the dry component and about 5% to about 25% by weight of the wet component.

18. The quartz-based casting composition of claim 13, wherein, when formed into 2-inch×2-inch×2-inch concrete blocks, the composition exhibits a weight loss of less than 1% after exposure to 15% aqueous sulfuric acid for 7 days.

19. The quartz-based casting composition of claim 13, wherein, when formed into 2-inch×2-inch×2-inch concrete blocks, the composition exhibits a weight loss of less than 1% after exposure to 15% aqueous sulfuric acid for 28 days.

* * * * *